(12) United States Patent
Kleitsch (10) Patent No.: US 9,181,964 B2
(45) Date of Patent: Nov. 10, 2015

(54) CONTROL VALVE WITH VARIABLE PRESSURE RELIEF

(71) Applicant: Caterpillar Inc., Peoria, IL (US)

(72) Inventor: Andew J. Kleitsch, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 387 days.

(21) Appl. No.: 13/863,603

(22) Filed: Apr. 16, 2013

(65) Prior Publication Data

US 2014/0305112 A1 Oct. 16, 2014

(51) Int. Cl.
*F16D 31/02* (2006.01)
*F15B 15/00* (2006.01)
*F15B 13/02* (2006.01)
*F16H 61/4017* (2010.01)

(52) U.S. Cl.
CPC .............. *F15B 15/00* (2013.01); *F15B 13/024* (2013.01); *F16H 61/4017* (2013.01)

(58) Field of Classification Search
CPC ............... F15B 13/024; F16H 61/4017; F16H 61/4052; F16H 61/4061
USPC ........................................ 60/422, 468; 91/451
See application file for complete search history.

(56) References Cited

U.S. PATENT DOCUMENTS

| | | | | |
|---|---|---|---|---|
| 4,321,855 A | * | 3/1982 | Bacquie et al. ................. | 91/451 |
| 4,561,463 A | | 12/1985 | Brownbill et al. | |
| 5,964,090 A | * | 10/1999 | Nam et al. ....................... | 60/422 |
| 6,681,568 B2 | * | 1/2004 | Smith ............................. | 60/422 |
| 6,694,859 B2 | * | 2/2004 | Smith ............................. | 60/468 |
| 7,222,484 B1 | | 5/2007 | Dornbach | |

* cited by examiner

*Primary Examiner* — Michael Leslie
(74) *Attorney, Agent, or Firm* — BakerHostetler (57) ABSTRACT

A hydraulic system and method of controlling hydraulic pressure are disclosed. The hydraulic system includes a pump fluidly coupled to a reservoir that contains hydraulic fluid, a control valve fluidly coupled to the pump, the control valve being selectively movable between at least two positions, a relief valve fluidly coupled to the pump via a relief conduit, the relief valve operable to flow hydraulic fluid from an outlet of the pump to the reservoir, and a variable pressure setpoint module fluidly coupled to the relief valve and the control valve. The variable pressure setpoint module being operable to open the relief valve in response to at least two pressure setpoints depending on a position of the control valve.

20 Claims, 5 Drawing Sheets

CONTROL VALVE WITH VARIABLE PRESSURE RELIEF

TECHNICAL FIELD

The disclosure relates generally to hydraulic pressure control in a hydraulic system, and more particularly, to apparatuses and methods for controlling a hydraulic pressure system including a variable relief pressure setpoint.

BACKGROUND

Hydraulic systems are known for converting fluid energy, for example, fluid pressure, into mechanical energy. Fluid power may be transferred from a hydraulic pump through fluid conduits to one or more hydraulic actuators. Hydraulic actuators may include hydraulic motors that convert fluid power into shaft rotational power, hydraulic cylinders that convert fluid power into translational motion, or the like.

Some hydraulic systems include a plurality of hydraulic actuators. For example, lift trucks for transporting materials may include a hydraulic motor to propel one or more drive wheels of the lift truck, in addition to an array of hydraulic cylinders that perform different functions, such as, for example, lifting a load against gravity, adjusting an angular orientation of the load with respect to the lift truck, and adjusting a distance between lift forks. Similarly, off-highway trucks for mining and excavation operations may include, for example, hydraulic motors to propel drive wheels and steer the truck, in addition to hydraulic cylinders to raise and lower a bucket.

In such systems, separate hydraulic actuators may have significantly different power requirements; and therefore, different corresponding pressure requirements to optimize system operability and efficiency. For example, the fork distance adjustment cylinder in a lift truck may have significantly lower pressure requirements than the lift cylinder in the same truck because, unlike the lift cylinder, the fork adjustment cylinder only has to move the weight of the forks and not the weight of a load bearing on the forks.

U.S. Pat. No. 7,222,484 (hereinafter "the '484 patent"), entitled "Hydraulic System with Multiple Pressure Relief Valves," purports to address the problem of various hydraulic pressure requirements in a hydraulic system. The '484 patent describes hydraulic systems in which various hydraulic actuators have different operating pressure limits as determined by separate pressure relief valves. However, incorporating multiple pressure relief valves into a hydraulic system can be disadvantageously expensive, bulky, and unreliable. Accordingly, there is a need for improved hydraulic system pressure controls.

SUMMARY

In one aspect, the disclosure describes a hydraulic system. The hydraulic system includes a pump fluidly coupled to a reservoir that contains hydraulic fluid, a control valve fluidly coupled to the pump, the control valve being selectively movable between at least two positions, a relief valve fluidly coupled to the pump via a relief conduit, the relief valve operable to flow hydraulic fluid from an outlet of the pump to the reservoir, and a variable pressure setpoint module fluidly coupled to the relief valve and the control valve, the variable pressure setpoint module being operable to open the relief valve in response to at least two pressure setpoints depending on a position of the control valve.

The variable pressure setpoint module includes a first pilot valve in fluid communication with the pump via a control orifice, the first pilot valve operable to flow hydraulic fluid from the control orifice to the reservoir via an internal passage defined by the control valve when the control valve is oriented in a first position and when a pressure in the variable pressure setpoint module exceeds a first pressure, and a second pilot valve in fluid communication with the pump via the control orifice, the second pilot valve operable to flow hydraulic fluid from the control orifice to the reservoir via a second return conduit when the control valve is oriented in a second position that blocks fluid communication between the control orifice and the reservoir via the control valve and when the pressure in the variable pressure setpoint module exceeds a second pressure, the second pressure being greater than the first pressure.

In another aspect, the disclosure describes a method of controlling hydraulic pressure. The method of controlling hydraulic pressure includes effecting a first pressure drop across a control orifice by flowing a first portion of hydraulic fluid from the control orifice to a reservoir via a first pilot valve, flowing a second portion of hydraulic fluid from a hydraulic pump to the reservoir via a relief valve by opening the relief valve in response to the first pressure drop across the control orifice, effecting a second pressure drop across the control orifice by flowing a third portion of hydraulic fluid from the control orifice to the reservoir via a second pilot valve, and flowing a fourth portion of hydraulic fluid from the hydraulic pump to the reservoir via the relief valve by opening the relief valve in response to the second pressure drop across the control orifice.

DETAILED DESCRIPTION

Referring now to the drawings, wherein like reference numbers refer to like elements, there is illustrated a machine including a hydraulic system. The machine can be any type of machine that performs an operation associated with an industry such as mining, construction, agriculture, transportation, or any other industry known in the art. For example, the machine may be an off-highway truck, an earth-moving machine, such as a wheel loader, excavator, dump truck, backhoe, motor grader, material handler, or the like. The specific machine illustrated in FIG. 1 is an off-highway dump truck.

Figure 1:
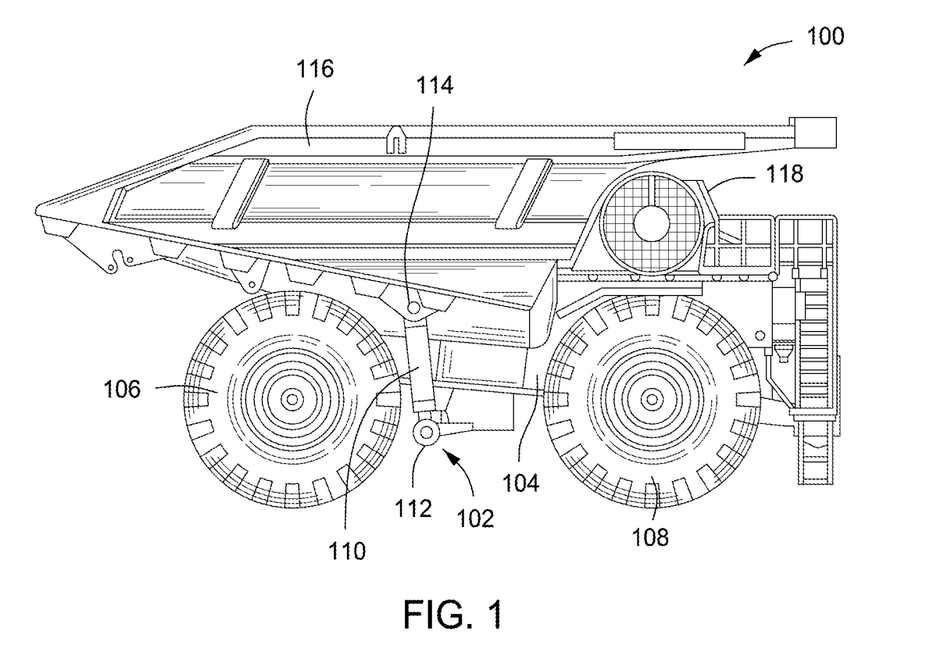
FIG. 1 shows a side view of a truck having a hydraulic system according to an aspect of the disclosure.
Figure 2:
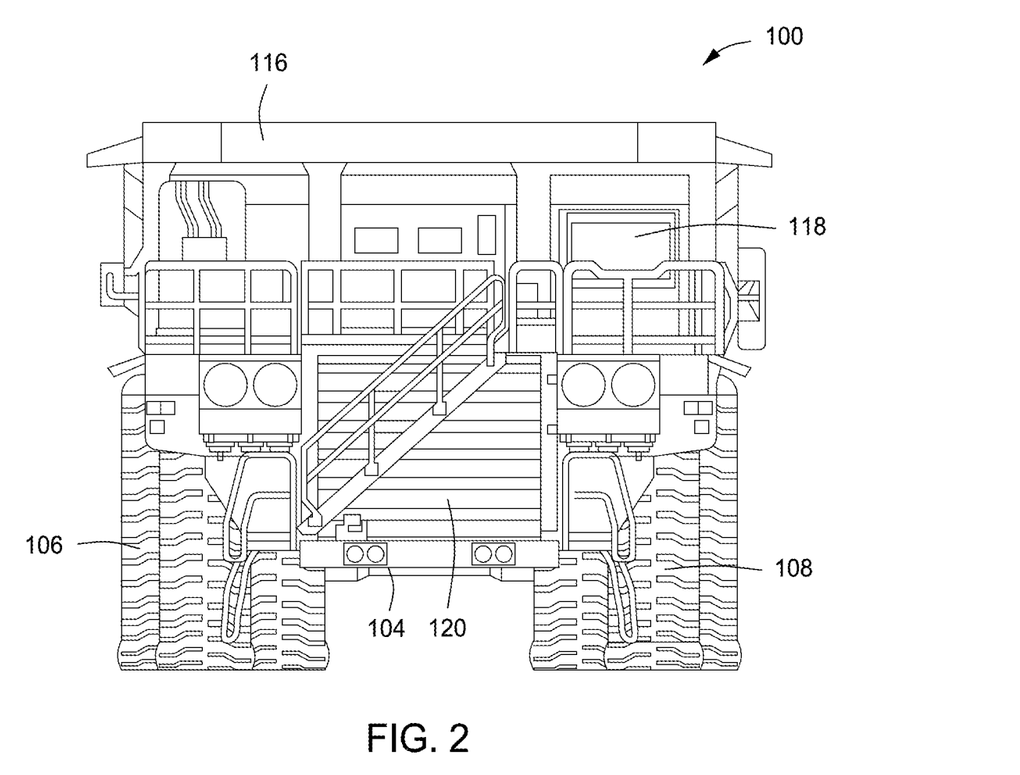
FIG. 2 shows a front view of the truck illustrated in FIG. 1.

Referring to FIGS. 1 and 2, it will be appreciated that FIG. 1 shows a side view of a truck 100 having a hydraulic system 102 according to an aspect of the disclosure; and FIG. 2 shows a front view of the truck illustrated in FIG. 1. Truck 100 includes a chassis 104, which may support various drive system components. The drive system components may include at least one drive wheel 106 and at least one idle wheel 108 rotatably coupled to the chassis 104. The at least one drive wheel 106 may be operably coupled to a hydraulic drive motor (not shown) or a transmission extending from a combustion engine, electric motor, or other prime mover known to persons with ordinary skill in the art (not shown). The at least one idle wheel 108 may be operably coupled to a hydraulic steering motor (not shown) to steer the direction of the at least one idle wheel with respect to the chassis 104. Although the truck 100 may include a rigid chassis, it may alternatively include an articulated chassis.

The truck 100 includes at least one hydraulic actuator 110 as part of a hydraulic system 102. The hydraulic actuator 110 may be a hydraulic cylinder extending from a pivoting connection 112 on the chassis to a pivoting connection 114 on a bucket 116. The bucket 116 may be pivotally coupled to the chassis 104 at a bucket pivot (not shown), and arranged to carry a payload when the truck 100 is in service. It will be appreciated that the hydraulic actuator 110 could be any hydraulic actuator arranged to serve functions known to persons of ordinary skill in the art.

The truck 100 may include a cab 118 configured to accommodate an operator and which may provide operator access to control inputs devices (not shown) such as hydraulic control valves located therein. Further, the truck 100 may include a power system enclosure 120 that houses one or more power sources (not shown) such as, for example, a combustion turbine engine, a reciprocating combustion engine, a fuel cell, a battery, a capacitor, or other power source known to persons having ordinary skill in the art. The one or more power sources may be operatively coupled to a hydraulic pump (not shown) that is fluidly coupled to the hydraulic system 102.

Figure 3:
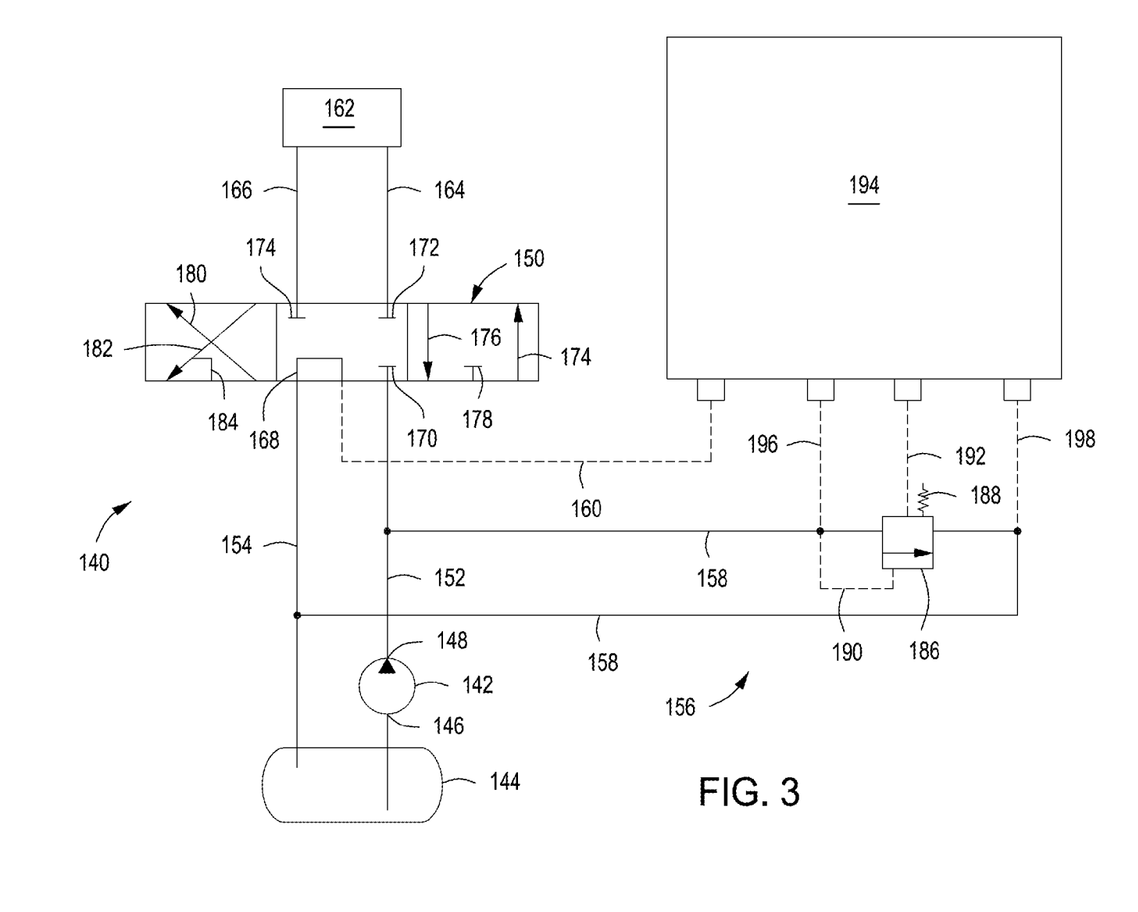
FIG. 3 shows a schematic view of a hydraulic system according to an aspect of the disclosure.

FIG. 3 shows a schematic view of a hydraulic system 140 according to an aspect of the disclosure. The hydraulic system 140 includes a pump 142 coupled to a reservoir 144 that is filled with hydraulic fluid. Hydraulic fluid from the reservoir 144 is drawn into an inlet 146 of the pump 142 and discharged at a higher pressure from an outlet 148 of the pump 142. The pump 142 is fluidly coupled to a control valve 150 through a first power conduit 152, and the reservoir 144 is fluidly coupled to the control valve 150 through a second power conduit 154.

A pressure control system 156 may be fluidly coupled to the pump 142 through a relief conduit 158, which continues downstream of the pressure control system 156 to the reservoir 144. The pressure control system 156 also may be fluidly coupled to the control valve 150 through a first return conduit 160.

In one aspect of the disclosure, the control valve 150 is fluidly coupled to a hydraulic actuator 162 through a first actuator conduit 164 and a second actuator conduit 166; and the control valve 150 is movable between at least two positions, that may include up to five connections for each position, thereby effecting at least two different states of fluid communication through the control valve 150. It will be appreciated that other arrangements are contemplated as well.

In a first position, as shown in FIG. 3, the control valve 150 effects fluid communication between the second power conduit 154 and the first return conduit 160 via an internal passage 168. Further corresponding to the first position of the control valve 150, the first power conduit 152, the first actuator conduit 164, and the second actuator conduit 166 are all blocked within the control valve 150 by blocking passages 170, 172, and 174, respectively.

Accordingly, when the control valve 150 is in its first position, the pressure control system 156 is in fluid communication with the reservoir 144 via the internal passage 168 of the control valve 150, and neither the pump 142 nor the reservoir 144 are in fluid communication with the hydraulic actuator 162. The first position of the control valve 150 may be known as a neutral position because it does not effect fluid communication between the pump 142 and the hydraulic actuator 162.

The control valve 150 may be configured in a second position by translating the control valve 150 to the left from its position shown in FIG. 3 with respect to the hydraulic system 140. In the second position, the control valve 150 effects fluid communication between the first power conduit 152 and the first actuator conduit 164 through the internal passage 174, and effects fluid communication between the second power conduit 154 and the second actuator conduit 166 through the internal passage 176. Further corresponding to the second position of the control valve 150, the first return conduit 160 is blocked within the control valve 150 by the blocking passage 178.

Accordingly, when the control valve 150 is configured in its second position, the pump 142 and the reservoir 144 are both in fluid communication with the hydraulic actuator 162, and the pressure control system 156 is not in fluid communication with the reservoir 144 via the first return conduit 160. When the hydraulic actuator 162 is a hydraulic cylinder, the second position of the control valve 150 may be known as a cylinder extending position because the hydraulic system 140 may act to extend the length of the hydraulic cylinder by increasing a pressure within the hydraulic cylinder, such as, for example, a hoist function for the bucket 116 of the truck 100 (see FIG. 1).

The control valve 150 may be configured in a third position by translating the control valve 150 to the right from its position shown in FIG. 3 with respect to the hydraulic system 140. In the third position, the control valve 150 effects fluid communication between the first power conduit 152 and the second actuator conduit 166 through the internal passage 180, and effects fluid communication between the second power conduit 154 and the first actuator conduit 164 through the internal passage 182. Further corresponding to the third position of the control valve 150, the first return conduit 160 is in fluid communication with the reservoir 144 through the internal passage 184.

Accordingly, when the control valve 150 is in its third position, the pump 142 and the reservoir 144 are both in fluid communication with the hydraulic actuator 162, and the pressure control system 156 is in fluid communication with the reservoir 144 via the first return conduit 160. When the hydraulic actuator 162 is a hydraulic cylinder, the third position of the control valve 150 may be known as a cylinder retracting position because the hydraulic system 140 may act to retract the length of the hydraulic cylinder by decreasing a pressure within the hydraulic cylinder, such as, for example, a lower function for the bucket 116 of the truck 100 (see FIG. 1).

Although the exemplary control valve 150 shown in FIG. 3 embodies three positions, with five connections per position, it will be appreciated that the control valve 150 could embody any number of positions and any number of connections per position. Further, the control valve 150 is not limited to the particular internal connections illustrated in FIG. 3, but rather, it will be appreciated that other control valve 150 internal connections could be employed without departing from the scope of the disclosure.

As shown in FIG. 3, the pressure control system 156 includes a relief valve 186 fluidly coupled to the pump 142 and the reservoir 144 via the relief conduit 158. The relief valve 186 may be movable between two positions, where a first position blocks fluid communication between the pump 142 and the reservoir 144 via the relief conduit 158, and a second position that effects fluid communication between the pump 142 and the reservoir 144 via the relief conduit 158. The relief valve 186 may be configured to toggle between open and closed positions, or alternatively, respond proportionally to a control input. The fluid flow path through the relief conduit 158 and the relief valve 186 are designed to effect a large enough flow from the pump 142 to the reservoir 144 to reduce the fluid pressure in the first power conduit 152.

The position of the relief valve 186 may be determined by a force balance across opposing sides of the relief valve 186. The relief valve 186 may include a resilient member 188 that biases the relief valve toward a closed position. Alternatively, it will be appreciated that the resilient member could be arranged to bias the relief valve 186 toward an open position. Fluid pressure acting against the relief valve 186 from a first pilot conduit 190 and a second pilot conduit 192 may act to bias the relief valve 186 toward its open position and its closed position, respectively. Thus, in the non-limiting aspect illustrated in FIG. 3, the relief valve 186 remains closed as long as the combined force applied by the second pilot conduit 192 and the resilient member 188 is not less than the force applied by the first pilot conduit 190.

The pressure control system 156 further includes a pressure setpoint module 194, which may be in fluid communication with the relief valve 186 through a third pilot conduit 196 and the second pilot conduit 192. The third pilot conduit 196 may be fluidly coupled to the relief conduit 158 upstream of the relief valve 186, as shown in FIG. 3, or any other point in the hydraulic system 140 containing a pressure representative of the pump 142 discharge pressure. The pressure setpoint module 194 may also be fluidly coupled to the first return conduit 160 and a second return conduit 198. It will be appreciated that the second return conduit 198 could be fluidly coupled to the reservoir 144 through the relief conduit 158, downstream of the relief valve 186, as shown in FIG. 3, or alternatively, the second return conduit 198 could extend to the reservoir 144 separate from the relief conduit 158 (not shown).

The pressure setpoint module 194 operates to vary the fluid pressure in the second pilot conduit 192 based on its state of fluid communication with other points in the hydraulic system 140, a time history of fluid pressure within the pressure setpoint module 194, or combinations thereof. In one aspect of the disclosure, the pressure setpoint module 194 may apply the same pressure to the second pilot conduit 192 as the first pilot conduit 190 when a pressure in the third pilot conduit 196 is less than a first threshold pressure, thereby maintaining the relief valve 186 in its closed position.

According to another aspect of the disclosure, when the pressure in the third pilot conduit 196 is not less than the first threshold pressure, the pressure setpoint module 194 may apply a pressure to the second pilot conduit 192 that is sufficiently lower than the pressure in the first pilot conduit 190 to overcome the force of the resilient member 188, thereby opening the relief valve 186. According to yet another aspect of the disclosure, the pressure setpoint module 194 may apply the same pressure to the second pilot conduit 192 as the first pilot conduit 190 when a pressure in the third pilot conduit 196 is less than a second threshold pressure, thereby maintaining the relief valve 186 in its closed position.

According to still yet another aspect of the disclosure, when the pressure in the third pilot conduit 196 is not less than the second threshold pressure, the pressure setpoint module 194 may apply a pressure to the second pilot conduit 192 that is sufficiently lower than the pressure in the first pilot conduit 190 to overcome the force of the resilient member 188, thereby opening the relief valve 186. Thus, the pressure setpoint module 194 may effect different pressure setpoints for opening the relief valve 186.

The fluid resistance of the first pilot conduit 190, the second pilot conduit 192, the third pilot conduit 196, and the pressure setpoint module 194 may be designed to be sufficiently small so that fluid communication between those flowpaths and the reservoir are not large enough to significantly affect fluid pressure in the first power conduit 152. Throughout the drawings in the disclosure, fluid conduits indicated with dashed lines may be sized sufficiently small to accommodate only signal-level or pilot-level flows that do not significantly effect fluid pressure in the first power conduit 152 by themselves, without causing action of the relief valve 186.

In one aspect of the disclosure, the first threshold pressure is less than the second threshold pressure. The first threshold pressure may be applied as the relief valve 186 opening setpoint pressure when the pressure setpoint module 194 is in fluid communication with the reservoir 144 via the first return conduit 160. Further, the second threshold pressure may be applied as the relief valve 186 opening setpoint pressure when the pressure setpoint module 194 is blocked from fluid communication with the reservoir 144 via the first return conduit 160.

Figure 4:
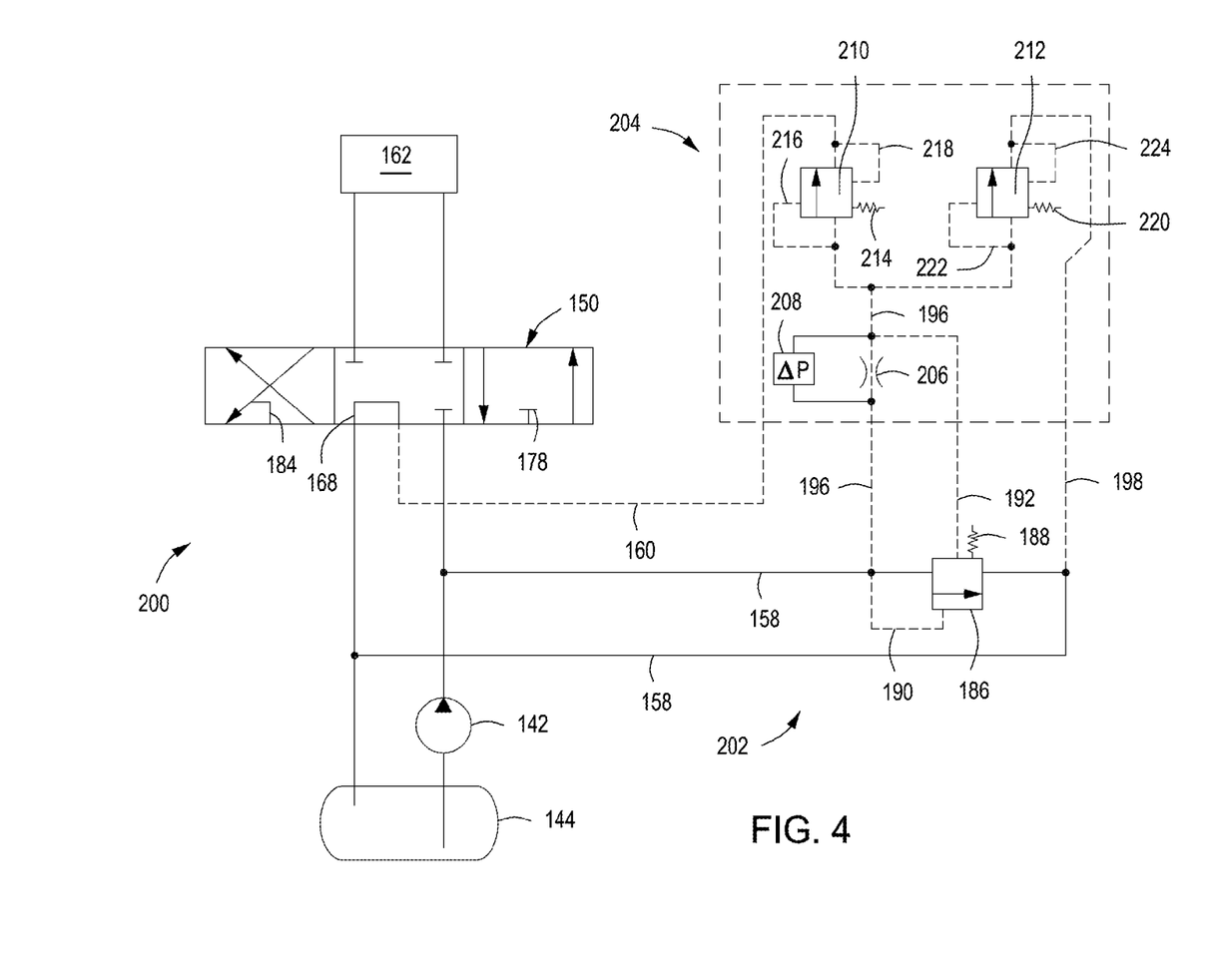
FIG. 4 shows a schematic view of a hydraulic system according to another aspect of the disclosure.

FIG. 4 shows a schematic view of a hydraulic system 200 according to another aspect of the disclosure. Similar to the aspect shown in FIG. 3, the hydraulic system 200 may include a pump 142, a reservoir 144, a control valve 150, and a hydraulic actuator 162. However, the hydraulic system 200 includes a pressure control system 202 having a relief valve 186 fluidly coupled to a pressure setpoint module 204.

The pressure setpoint module 204 includes a control orifice 206 that is in fluid communication with the relief conduit 158 via the third pilot conduit 196. Further, the second pilot conduit 192 is fluidly coupled with the third pilot conduit 196 downstream of the control orifice 206, opposite the relief conduit 158. Thus, the difference in fluid pressure between the first pilot conduit 190 and the second pilot conduit 192, and therefore the difference in fluid actuation pressure across the relief valve 186, is equal to the pressure drop 208 across the control orifice 206, neglecting any other fluid pressure drops through any of the pilot conduits.

As will be appreciated by those with ordinary skill in the art, a pressure drop 208 across the control orifice 206 can be generated by effecting a flow through the control orifice 206. Thus, in the absence of fluid flow through the control orifice 206, the pressure drop 208 across the control orifice 206 is substantially zero, and therefore the resilient member 188 maintains the relief valve 186 in a closed position to block fluid communication between the pump 142 and the reservoir 144 via the relief conduit 158. On the other hand, a flow of sufficient magnitude from the relief conduit 158 through the control orifice 206 may create a sufficient pressure drop 208 to overcome the force of the resilient member 188 to actuate the relief valve 186 to an open position, thereby effecting fluid communication between the pump 142 and the reservoir 144 via the relief valve 186.

The pressure setpoint module 204 further includes a first pilot valve 210 and a second pilot valve 212 in fluid communication with the relief conduit 158 via the control orifice 206. According to an aspect of the disclosure shown in FIG. 4, both the first pilot valve 210 and the second pilot valve 212 are two position valves with two connections. However, it will be appreciated that the pilot valves 210, 212 could embody any number of positions and connections per position.

A resilient member 214 biases the first pilot valve 210 toward a closed position that blocks fluid communication between the third pilot conduit 196 and the first return conduit 160 via the first pilot valve 210. However, the first pilot valve 210 is operable to move to a second position when a pressure in the fourth pilot conduit 216 is sufficiently larger than a pressure in the fifth pilot conduit 218 to overcome the resilience of the resilient member 214. Thus, the second position of the first pilot valve 210 is arranged to effect fluid communication between the third pilot conduit 196 and the first return conduit 160 via the first pilot valve 210.

A threshold pressure across the first pilot valve 210 that is sufficient to open the first pilot valve 210 may be referred to as the pressure setpoint of the valve. The pressure setpoint of the first pilot valve 210 is a function of a spring rate of the resilient member 214 and the hydraulic areas exposed to the fluid pressures in the fourth pilot conduit 216 and the fifth pilot conduit 218, respectively, among other design considerations. Further, when the pressure in the first return conduit 160 is substantially atmospheric pressure or reservoir 144 pressure, the first pilot valve 210 opens when a pressure in the fourth pilot conduit 216 exceeds the pressure setpoint of the first pilot valve 210.

When the control valve 150 is oriented in a position such that the first return conduit 160 is in fluid communication with the reservoir 144 through either the internal passage 168 or the internal passage 184, a pressure in the third pilot conduit 196 that exceeds the pressure setpoint of the first pilot valve 210 may open the first pilot valve 210, thereby effecting a flow from the relief conduit 158 to the reservoir 144 via the control orifice 206. Further, it will be appreciated that the flow through the control orifice 206 as a result of opening the first pilot valve 210 may cause a pressure drop 208 across the control orifice 206 sufficient to open the relief valve 186. Thus, a pressure in the fourth pilot conduit 216 that exceeds the setpoint pressure of the first pilot valve 210 may cause the relief valve 186 to open, thereby relieving pressure from the relief conduit 158 to the reservoir 144.

However, when the control valve 150 is oriented in a position such that the first return conduit 160 is blocked from fluid communication with the reservoir, for example, by the blocking passage 178, a substantial fluid pressure may be trapped in the first return conduit 160. In such a circumstance, fluid pressure retained in the first return conduit 160 may prevent the first pilot valve 210 from opening, even if the pressure in the fourth pilot conduit 216 exceeds the pressure setpoint for the first pilot valve 210. This may occur when the pressure difference between the fourth pilot conduit 216 and the fifth pilot conduit 218 does not exceed the pressure setpoint for the first pilot valve 210. But when the control valve 150 blocks fluid communication between the first return conduit 160 and the reservoir 144 via an internal passage of the control valve 150, the second pilot valve 212 may still act to effect another pressure setpoint, as next discussed.

A resilient member 220 biases the second pilot valve 212 toward a closed position that blocks fluid communication between the third pilot conduit 196 and the reservoir 144 via the second pilot valve 212. However, the second pilot valve 212 is operable to move to a second position when a pressure in the sixth pilot conduit 222 is sufficiently larger than a pressure in the seventh pilot conduit 224 to overcome the resilience of the resilient member 220. Thus, the second position of the second pilot valve 212 may be arranged to effect fluid communication between the third pilot conduit 196 and the reservoir 144 via the second pilot valve 212.

A threshold pressure across the second pilot valve 212 that is sufficient to open the second pilot valve 212 may be referred to as the pressure setpoint of the second pilot valve 212. The pressure setpoint of the second pilot valve 212 is a function of a spring rate of the resilient member 220 and the hydraulic areas exposed to the fluid pressures in the sixth pilot conduit 222 and the seventh pilot conduit 224, respectively, among other design considerations. Further, when the pressure in the second return conduit 198 is substantially atmospheric pressure or reservoir 144 pressure, the second pilot valve 212 opens when a pressure in the sixth pilot conduit 222 exceeds the pressure setpoint of the second pilot valve 212.

A pressure in the third pilot conduit 196 that exceeds the pressure setpoint of the second pilot valve 212 may open the second pilot valve 212, thereby effecting a flow from the relief conduit 158 to the reservoir 144 via the control orifice 206. Further, it will be appreciated that the flow through the control orifice 206 as a result of opening the second pilot valve 212 may cause a pressure drop 208 across the control orifice 206 sufficient to open the relief valve 186. Thus, a pressure in the sixth pilot conduit 222 that exceeds the setpoint pressure of the second pilot valve 212 may cause the relief valve 186 to open, thereby relieving pressure from the relief conduit 158 to the reservoir 144.

Accordingly, when the pressure setpoint of the first pilot valve 210 is lower than the pressure setpoint of the second pilot valve 212, and the first return conduit 160 is in fluid communication with the reservoir 144 via an internal passage 168 of the control valve 150, the relief valve 186 will be controlled substantially according to the pressure setpoint of the first pilot valve 210. Further, when the first return conduit 160 is blocked from fluid communication with reservoir 144 through the control valve 150, the relief valve 186 will be controlled substantially according to the pressure setpoint of the second pilot valve 212, independent of the state of the first pilot valve 210. Therefore, fluid interaction between the control valve 150 and the pressure setpoint module 204 enables variable pressure control setpoints for the relief valve 186 depending on the position of the control valve 150.

Figure 5:
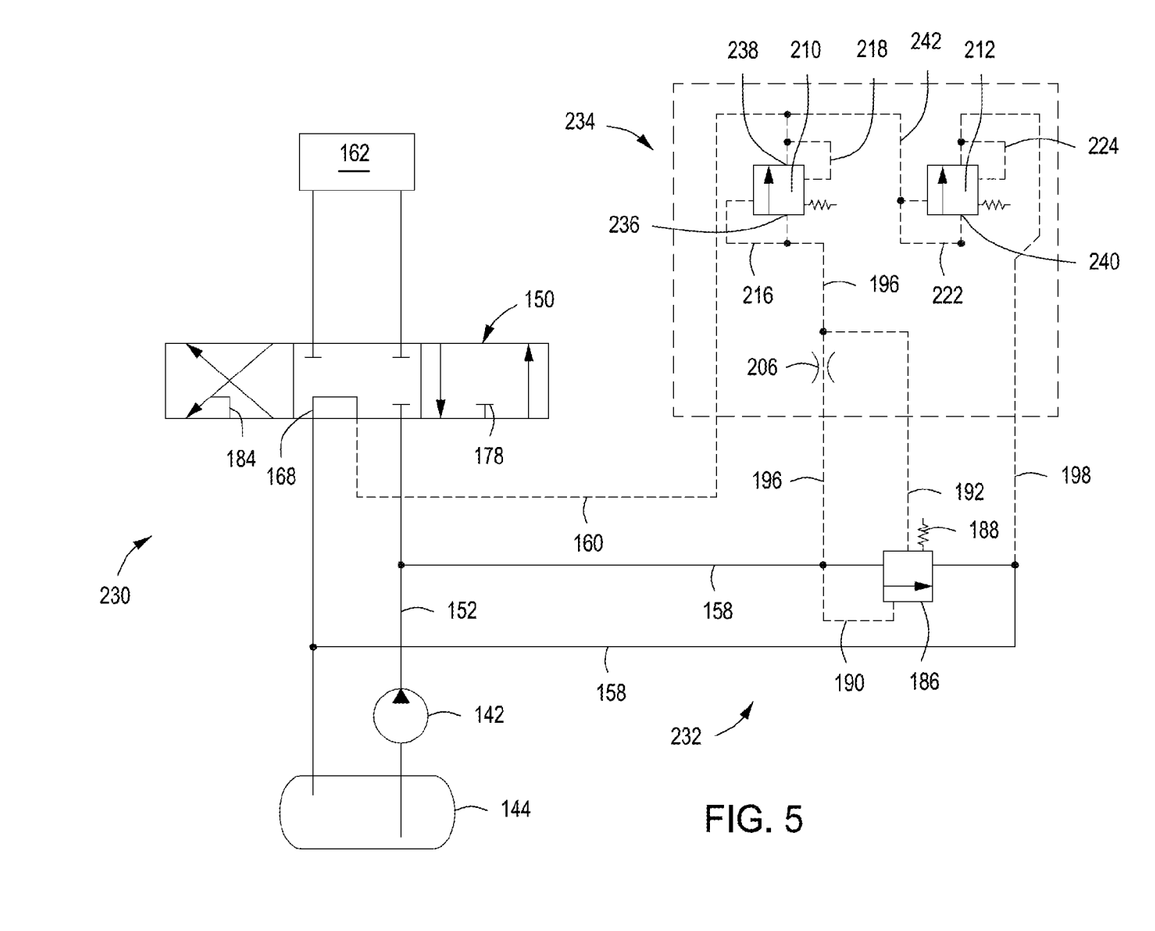
FIG. 5 shows a schematic view of a hydraulic system according to yet another aspect of the disclosure.

FIG. 5 shows a schematic view of a hydraulic system 230 according to yet another aspect of the disclosure. Similar to the aspect shown in FIG. 3, the hydraulic system 230 may include a pump 142, a reservoir 144, a control valve 150, and a hydraulic actuator 162. However, the hydraulic system 230 includes a pressure control system 232 having a relief valve 186 fluidly coupled to a pressure setpoint module 234. And similar to the aspect shown in FIG. 4, the pressure setpoint module 234 includes a first pilot valve 210 and a second pilot valve 212, but the pilot valves 210, 212 of the pressure setpoint module 234 are arranged with one another in series instead of in parallel, as discussed below.

Referring to FIG. 5, an inlet 236 of the first pilot valve 210 is fluidly coupled to the control orifice 206 via the third pilot conduit 196. Further, an outlet 238 of the first pilot valve 210 is fluidly coupled to both the first return conduit 160 and an inlet 240 of the second pilot valve 212 via an eighth pilot conduit 242.

When the control valve 150 is oriented in a position such that the first return conduit 160 is in fluid communication with the reservoir 144 through either the internal passage 168 or the internal passage 184, for example, a pressure in the third pilot conduit 196 in excess of the pressure setpoint of the first pilot valve 210 may open the first pilot valve 210, thereby effecting a flow from the relief conduit 158 to the reservoir 144 via the control orifice 206. Further, it will be appreciated that the flow through the control orifice 206 as a result of opening the first pilot valve 210 may cause a pressure drop across the control orifice 206 sufficient to open the relief valve 186. Thus, a pressure in the fourth pilot conduit 216 in excess of the setpoint pressure of the first pilot valve 210 may cause the relief valve 186 to open, thereby relieving pressure from the first return conduit 160 to the reservoir 144.

When the control valve 150 is oriented in a position such that the first return conduit 160 is blocked from fluid communication with the reservoir 144, for example, by the blocking passage 178, fluid may still flow through the pressure setpoint module 234 to the reservoir 144 via the first pilot valve 210, the second pilot valve 212, and the second return conduit 198. In such a series configuration, a pressure in the third pilot conduit 196 must exceed the sum of the pressure setpoint of the first pilot valve 210 and the pressure setpoint of the second pilot valve 212 to simultaneously open both pilot valves 210, 212. In turn, a pressure in the third pilot conduit 196 in excess of the sum of the pressure setpoint of the first pilot valve 210 and the pressure setpoint of the second pilot valve 212 may effect a flow through the control orifice 206 sufficient to open the relief valve 186.

Accordingly, when the pressure setpoint of the first pilot valve 210 is lower than the pressure setpoint of the second pilot valve 212, and the first return conduit 160 is in fluid communication with the reservoir 144 via the control valve 150, the relief valve 186 may be controlled substantially according to the pressure setpoint of the first pilot valve 210. Further, when the first return conduit 160 is blocked from fluid communication with reservoir 144 via the blocking passage 178 of the control valve 150, the relief valve 186 will be controlled substantially according to the sum of the pressure setpoint of the first pilot valve 210 and the pressure setpoint of the second pilot valve 212. For example, to effect pressure relief setpoints of 2000 psi and 3000 psi according to the aspect shown in FIG. 5, the pressure setpoint of the first pilot valve would be approximately 2000 psi and the pressure setpoint of the second pilot valve 210 would be approximately 1000 psi. Therefore, fluid interaction between the control valve 150 and the pressure setpoint module 234 enables variable pressure control setpoints for the relief valve 186 depending on the position of the control valve 150.

INDUSTRIAL APPLICABILITY

The disclosure is universally applicable to any machine with a hydraulic system. In particular, there are many types of off-highway vehicles associated with industries such as mining, construction, agriculture, transportation, and other industrial applications known to persons of ordinary skill in the art. The off-highway vehicle may be, for example, an earth-moving machine, such as a track type tractor, track loader, wheel loader, excavator, dump truck, backhoe, motor grader, a material handler, or the like.

In one configuration, as shown in FIG. 1, an operator located in the cab 118 may activate a control input device to the hydraulic system 102, such as, for example, a control valve 150 (see FIG. 3), causing the hydraulic actuator 110 to either extend or retract in response changes in fluid pressure within the hydraulic actuator 110. Extension of the hydraulic actuator 110 may rotate the bucket 116 about the bucket pivot in a first direction, away from the chassis 104, to a dumping position for unloading the bucket payload. And retraction of the hydraulic actuator 110 may rotate the bucket 116 about the bucket pivot in a second direction to lower the bucket 116 to rest on the chassis 104 in a hauling position.

In one aspect, the hydraulic system 102 may benefit from a high pressure to raise the bucket 116, and perhaps a payload disposed therein, to a dumping position by extending the hydraulic actuator 110. In another aspect, the hydraulic system 102 may benefit from a lower pressure to lower the bucket 116 during a power down function by retracting the hydraulic actuator 110.

Referring to FIGS. 4 and 5, when the control valve 150 is in a neutral position, thereby blocking fluid communication between the hydraulic actuator 162 and the pump 142, system energy efficiency and component life may benefit from a reduced pump 142 discharge pressure. Thus, it may be desirable to operate the relief valve 186 in response to a low pressure setpoint when the control valve 150 is in a neutral position. A low pressure setpoint for the relief valve 186 may be accomplished according to aspects of the disclosure by effecting fluid communication between the first return conduit 160 and the reservoir 144 through the internal passage 168 of the control valve 150, as discussed above When the control valve 150 is adjusted to a cylinder extending function, thereby enabling fluid communication between the hydraulic actuator 162 and the pump 142, system performance may benefit from an increased pump 142 output pressure to increase the hydraulic energy available to perform work using the hydraulic actuator 162. One example of a cylinder extending function could include raising the bucket 116 on the truck 100. Thus, it may be desirable to operate the relief valve 186 according to a high pressure setpoint when the control valve 150 is in a position corresponding to the cylinder extending function. A high pressure setpoint for the relief valve 186 may be accomplished according to aspects of the disclosure by blocking fluid communication between the first return conduit 160 and the reservoir 144 via the blocking passage 178 of the control valve 150, as discussed above.

When the control valve 150 is in a cylinder retracting position, thereby enabling fluid communication between the hydraulic actuator 162 and the pump 142 to decrease a pressure in the hydraulic cylinder, system energy efficiency, component life, and safety may benefit from a reduced pump 142 discharge pressure. Thus, it may be desirable to operate the relief valve 186 according to the low pressure setpoint when the control valve 150 is in a cylinder retracting position. A low pressure setpoint for the relief valve 186 may be accomplished according to aspects of the disclosure by effecting fluid communication between the first return conduit 160 and the reservoir 144 through the internal passage 184 of the control valve 150, as discussed above.

The ability to vary the pressure setpoint for relief valve operation using only one relief valve offers advantages over conventional approaches by decreasing system size, improving system reliability, and decreasing system cost. Further, aspects of the disclosure allow variation in pressure control setpoint for different operation modes of a single hydraulic actuator that are not achieved by conventional approaches.

Moreover, aspects of the disclosure allow a wider range of pressure setpoint variation than conventional approaches. For example, conventional approaches allow a high pressure setpoint that is only approximately 20-50% higher than a corresponding low setpoint. By contrast, aspects of the disclosure are capable of achieving wider ratios between a high pressure setpoint and a low pressure setpoint, including the ratios achieved by conventional approaches. For example, in one aspect, a hydraulic system benefits from a ratio of a high pressure setting to a low pressure setting not less than about 2:1. In another aspect, a hydraulic system with a different configuration benefits from a ratio of a high pressure setting to a low pressure setting not less than about 5:1.

As far as differences between pressure setpoints, in one aspect, a difference between a first pressure setpoint and a second pressure setpoint for the relief valve 186 could be greater than or equal to 1 psi. In another aspect, for a hydraulic system with another configuration, a difference between a first pressure setpoint and a second pressure setpoint for the relief valve could be greater than or equal to 20,000 psi. In yet another aspect, a hydraulic system with another configuration benefits from a low pressure setpoint not greater than about 500 psi and a high pressure setpoint not less than about 2750 psi for the relief valve 186. In still yet another aspect, a hydraulic system with another configuration benefits from a low pressure setpoint not greater than about 1000 psi and a high pressure setpoint not less than about 5000 psi for the relief valve 186.

Although the specific aspects disclosed herein describe apparatuses and methods for applying two pressure setpoints to the relief valve 186, it will be appreciated that more than two pressure setpoints may be applied to the same relief valve without departing from the scope of the disclosure. In particular, any number of pilot valves may be added to the two pilot valves 210, 212, in parallel arrangement (see FIG. 4) or series arrangement (see FIG. 5), to effect a number of pressure setpoints greater than two. Further, a corresponding number of connections, positions, and internal or blocking passages passages may be added to the control valve 150 to control the logical sequencing of more than two pressure setpoints for the relief valve 186 according to aspects of the disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A hydraulic system, comprising:
a pump fluidly coupled to a reservoir that contains hydraulic fluid;
a control valve fluidly coupled to the pump, the control valve being selectively movable between at least two positions;
a relief valve fluidly coupled to the pump via a relief conduit, the relief valve operable to flow hydraulic fluid from an outlet of the pump to the reservoir; and
a variable pressure setpoint module fluidly coupled to the relief valve and the control valve, the variable pressure setpoint module being operable to open the relief valve in response to at least two pressure setpoints depending on a position of the control valve, the variable pressure setpoint module including
a first pilot valve in fluid communication with the pump via a control orifice, the first pilot valve operable to flow hydraulic fluid from the control orifice to the reservoir via an internal passage defined by the control valve when the control valve is oriented in a first position and when a pressure in the variable pressure setpoint module exceeds a first pressure, and
a second pilot valve in fluid communication with the pump via the control orifice, the second pilot valve operable to flow hydraulic fluid from the control orifice to the reservoir via a second return conduit when the control valve is oriented in a second position that blocks fluid communication between the control orifice and the reservoir via the control valve and when the pressure in the variable pressure setpoint module exceeds a second pressure, the second pressure being greater than the first pressure.

2. The hydraulic system of claim 1, wherein the first position of the control valve blocks fluid communication between the pump and a hydraulic actuator.

3. The hydraulic system of claim 1, wherein the first position of the control valve effects fluid communication between the pump and a hydraulic actuator.

4. The hydraulic system of claim 1, wherein the second position of the control valve effects fluid communication between the pump and a hydraulic actuator.

5. The hydraulic system of claim 1, wherein a resilient member biases the relief valve toward a position that blocks fluid communication between the outlet of the pump and the reservoir via the relief conduit.

6. The hydraulic system of claim 1, wherein a difference between the second pressure and the first pressure is not less than about 1 psi.

7. The hydraulic system of claim 6, wherein a difference between the second pressure and the first pressure is not less than about 2250 psi.

8. The hydraulic system of claim 1, wherein a ratio of the second pressure to the first pressure is not less than about 2.

9. The hydraulic system of claim 8, wherein a ratio of the second pressure to the first pressure is not less than about 5.

10. The hydraulic system of claim 1, wherein an inlet of the first pilot valve and an inlet of the second pilot valve are fluidly coupled to an exit of the control orifice, and
wherein an outlet of the first pilot valve and an outlet of the second pilot valve are fluidly coupled to the reservoir.

11. The hydraulic system of claim 1, wherein an inlet of the first pilot valve is fluidly coupled to an outlet of the control orifice, and an outlet of the first pilot valve is fluidly coupled to an inlet of the second pilot valve.

12. The hydraulic system of claim 1, wherein the pump is selectively in fluid communication with a hydraulic actuator through the control valve.

13. The hydraulic system of claim 12, wherein the hydraulic actuator is a hydraulic cylinder coupled between a bucket and a chassis of a truck to hoist or lower the bucket.

14. The hydraulic system of claim 3, wherein the first position of the control valve is operable to decrease a hydraulic pressure in the hydraulic actuator.

15. The hydraulic system of claim 4, wherein the second position of the control valve is operable to increase a hydraulic pressure in the hydraulic actuator.

16. The hydraulic system of claim 1, wherein the second pressure is approximately a pressure setpoint of the second pilot valve.

17. A machine, comprising:
a chassis;
a bucket pivotally coupled to the chassis;
a hydraulic cylinder pivotally coupled to the bucket and the chassis; and
a hydraulic system to control the hydraulic cylinder, the hydraulic system including:

a pump fluidly coupled to a reservoir that contains hydraulic fluid;

a control valve fluidly coupled to the pump, the control valve being selectively movable between at least two positions;

a relief valve fluidly coupled to the pump via a relief conduit, the relief valve operable to flow hydraulic fluid from an outlet of the pump to the reservoir; and a variable pressure setpoint module fluidly coupled to the relief valve and the control valve, the variable pressure setpoint module being operable to open the relief valve in response to at least two pressure setpoints depending on a position of the control valve, the variable pressure setpoint module including a first pilot valve in fluid communication with the pump via a control orifice, the first pilot valve operable to flow hydraulic fluid from the control orifice to the reservoir via an internal passage defined by the control valve when the control valve is oriented in a first position and when a pressure in the variable pressure setpoint module exceeds a first pressure, and a second pilot valve in fluid communication with the pump via the control orifice, the second pilot valve operable to flow hydraulic fluid from the control orifice to the reservoir via a second return conduit when the control valve is oriented in a second position that blocks fluid communication between the control orifice and the reservoir via the control valve and when the pressure in the variable pressure setpoint module exceeds a second pressure, the second pressure being greater than the first pressure.

18. A method of controlling hydraulic pressure, comprising:

effecting a first pressure drop across a control orifice by flowing a first portion of hydraulic fluid from the control orifice to a reservoir via a first pilot valve;

flowing a second portion of hydraulic fluid from a hydraulic pump to the reservoir via a relief valve by opening the relief valve in response to the first pressure drop across the control orifice;

effecting a second pressure drop across the control orifice by flowing a third portion of hydraulic fluid from the control orifice to the reservoir via a second pilot valve; and flowing a fourth portion of hydraulic fluid from the hydraulic pump to the reservoir via the relief valve by opening the relief valve in response to the second pressure drop across the control orifice.

19. The method of claim 18, further comprising:

effecting fluid communication between the first pilot valve and the reservoir via a control valve by adjusting the control valve to a first position;

opening the first pilot valve in response to a hydraulic pressure difference across the first pilot valve in excess of a first pressure setpoint;

blocking fluid communication between the first pilot valve and the reservoir via the control valve by adjusting the control valve to a second position; and opening the second pilot valve in response to a hydraulic pressure difference across the second pilot valve in excess of a second pressure setpoint.

20. The method of claim 19, wherein the second pressure setpoint is greater than the first pressure setpoint.

* * * * *